(12) United States Patent
Qualich et al.

(10) Patent No.: US 7,354,166 B2
(45) Date of Patent: Apr. 8, 2008

(54) AUTOMATIC VIEWING OF VEHICLE BLIND SPOT

(75) Inventors: John R. Qualich, Buffalo Grove, IL (US); Michael J. McGrath, Livonia, MI (US)

(73) Assignee: Temic Automotive of North America, Inc., Deer Park, IL (US)

( * ) Notice: Subject to any disclaimer, the term of this patent is extended or adjusted under 35 U.S.C. 154(b) by 0 days.

(21) Appl. No.: 10/722,036

(22) Filed: Nov. 25, 2003

(65) Prior Publication Data

US 2005/0111117 A1    May 26, 2005

(51) Int. Cl.
*G02B 5/08* (2006.01)
*B60R 1/06* (2006.01)

(52) U.S. Cl. ............... 359/843; 359/877; 307/10.1; 701/49

(58) Field of Classification Search ........... 359/843, 359/872, 877; 388/907.5; 701/49; 307/10.1; 340/501, 901, 904; 702/150
See application file for complete search history.

(56) References Cited

U.S. PATENT DOCUMENTS

| | | | |
|---|---|---|---|
| 4,267,494 A * | 5/1981 | Matsuoka et al. | 318/568.1 |
| 4,698,571 A * | 10/1987 | Mizuta et al. | 318/568.1 |
| 4,811,226 A * | 3/1989 | Shinohara | 701/49 |
| 5,111,125 A * | 5/1992 | Barrs | 318/603 |
| 5,306,953 A * | 4/1994 | Weiner | 307/10.1 |
| 5,313,335 A | 5/1994 | Gray et al. | |
| 5,621,457 A | 4/1997 | Ishiwaka et al. | |
| 5,668,675 A * | 9/1997 | Fredricks | 359/843 |
| 5,694,259 A * | 12/1997 | Brandin | 359/843 |
| 5,706,144 A * | 1/1998 | Brandin | 359/843 |
| 5,786,772 A * | 7/1998 | Schofield et al. | 340/903 |
| 5,796,176 A * | 8/1998 | Kramer et al. | 307/10.1 |
| 5,798,575 A * | 8/1998 | O'Farrell et al. | 307/10.1 |
| 5,949,592 A * | 9/1999 | Brandin | 359/843 |
| 5,993,015 A * | 11/1999 | Fredricks | 359/843 |
| 6,093,976 A | 7/2000 | Kramer et al. | |
| 6,116,742 A * | 9/2000 | Ahn | 359/843 |
| 6,163,083 A | 12/2000 | Kramer et al. | |
| 6,176,587 B1 * | 1/2001 | Fredricks | 359/843 |
| 6,184,791 B1 | 2/2001 | Baugh | |
| 6,193,380 B1 * | 2/2001 | Jacobs | 359/843 |
| 6,286,983 B1 | 9/2001 | Macher et al. | |
| 6,302,547 B1 | 10/2001 | Valentino | |
| 6,315,419 B1 | 11/2001 | Platzer, Jr. | |
| 6,350,037 B1 * | 2/2002 | Adams | 359/843 |
| 6,388,565 B1 | 5/2002 | Bernhard et al. | |
| 6,496,117 B2 * | 12/2002 | Gutta et al. | 340/576 |
| 6,840,637 B2 * | 1/2005 | Wang | 359/843 |
| 6,859,144 B2 * | 2/2005 | Newman et al. | 340/576 |
| 6,880,941 B2 * | 4/2005 | Suggs | 359/843 |

FOREIGN PATENT DOCUMENTS

| | | |
|---|---|---|
| EP | 0 591 743 A1 | 9/1993 |
| EP | 1 271 179 A2 | 1/2003 |
| WO | WO 01/61371 A3 | 8/2001 |
| WO | WO 02/093529 A1 | 11/2002 |

* cited by examiner

*Primary Examiner*—Ricky D. Shafer

(57) ABSTRACT

Observing an object within a visual blind spot of a motor vehicle includes using a mirror with at least one motor mechanically coupled thereto. Preferably, a position of the side view mirror can be adjusted by the at least one motor. An object detector detects objects within a visual blind spot of a vehicle. The object detector is operable to provide a detection signal to the at least one motor to adjust a position of the mirror to provide a view of the blind spot to a driver of the vehicle. The view can be toggled between normal viewing and blind spot viewing depending on the detection signal. The view can also be adjusted to track the object.

15 Claims, 3 Drawing Sheets

AUTOMATIC VIEWING OF VEHICLE BLIND SPOT

FIELD OF THE INVENTION

This invention in general relates to motor vehicles and, more particularly, to a method and apparatus to observe objects in a motor vehicle's blind spot.

BACKGROUND OF THE INVENTION

It is important for a driver of a vehicle to be aware of other objects and vehicles in proximity to the driver's vehicle. It would be ideal if a driver had circumferential vision to be able to see all the way around the vehicle at all times. However, due to the forward-facing placement of a driver's eyes, supplemental visual devices have been introduced to augment a driver's view around a vehicle. Two of the most popular devices used are mirrors and, more recently, the addition of cameras.

In both of these cases, the supplemental visual device (i.e. mirror(s) or a camera monitor) is placed in the forward field of view of a driver giving the driver a view to the side and/or rear of the vehicle. Unfortunately, these forward-placed devices must be limited to a suitable size that does not block the driver's normal forward field of view outside of the vehicle. As a result, visual blind spots are formed wherein the driver does not have a complete view of the side and/or rear of the vehicle. In other words, objects and vehicles that are positioned within a visual blind spot can not be seen by the driver. Detecting such objects or vehicles in a blind spot is important for a driver. In particular, this is important for those cases when a driver wishes to change lanes. To resolve this problem, a typical solution is for a driver to turnaround and glance at their blind spots before changing lanes. However, this requires drivers to take their eyes off of the road in front of them, which is not desirable even for a brief moment.

Another solution, available in Europe, is to provide a convex portion for the side view mirrors in a vehicle. The convex portion enlarges the sideward view of a driver in a continuous manner to encompass the vehicle blind spot. However, this option is not legal in the United States at the present time. Another less desirable solution is for the driver to use the available mirror controls in the car to adjust to see the blind spot. However, such mirror controls are often slow-moving and difficult to control causing more distractions than help. Another solution is to provide more mirrors to cover different rear or side views. However, this blocks more of the forward view of the driver. Still other solutions provide some indication to the driver that an object is detected somewhere near the vehicle, but these do not provide a view of such objects.

Therefore, it is desirable to provide an improved technique to view objects in a blind spot of a vehicle that overcomes most, if not all, of the preceding problems. It would also be beneficial if a technique could be provided to maintain such blind spot objects within the view of the driver.

Figure 1:
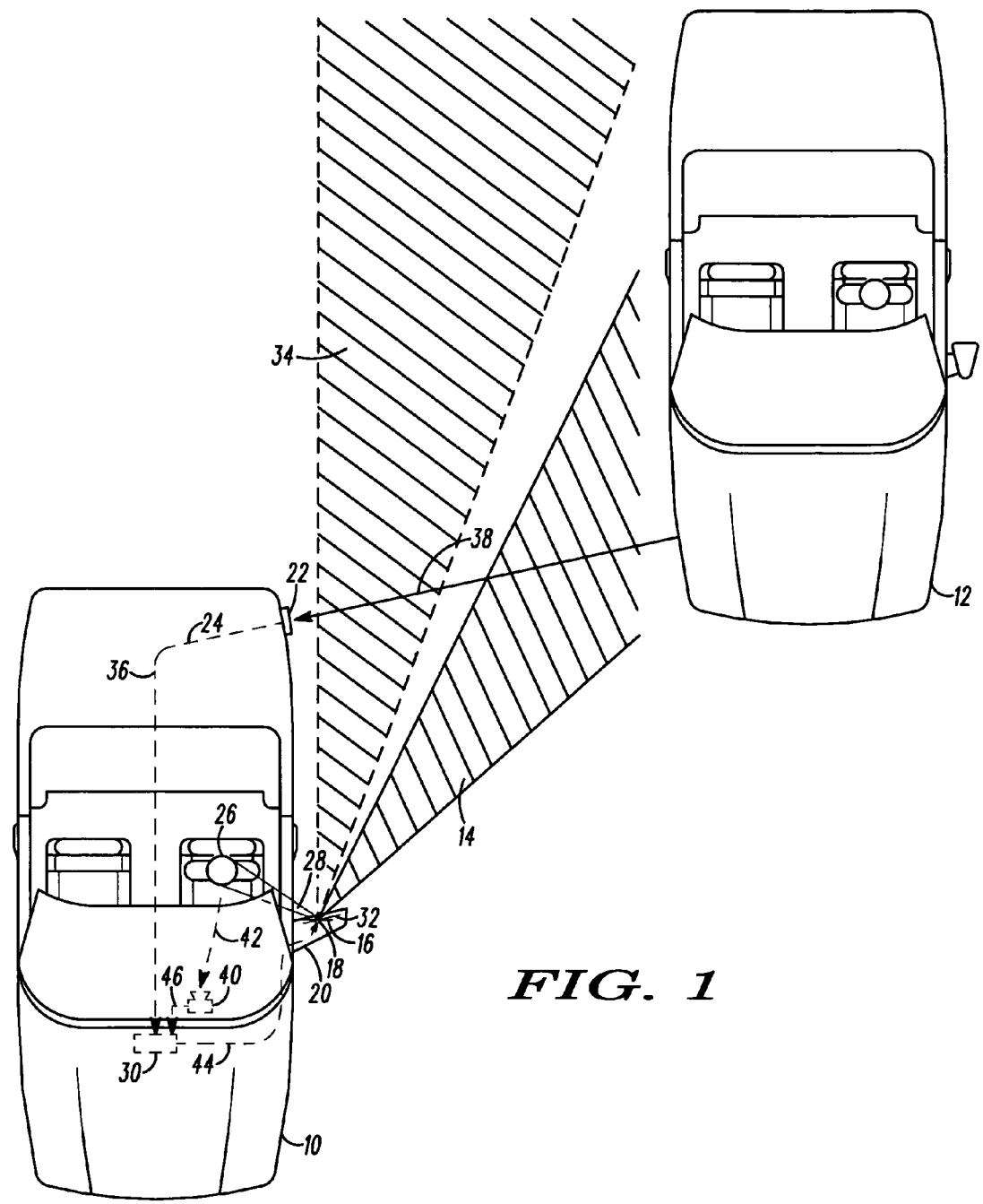
FIG. 1 is a top operational view of a vehicle blind spot viewing apparatus, in accordance with the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the broad scope of the invention as defined by the appended claims.

DETAILED DESCRIPTION OF THE PREFERRED EMBODIMENT

The present invention provides an improved technique to view objects in a blind spot of a vehicle that overcomes most, if not all, of the preceding problems. The present invention also describes a technique to maintain such blind spot objects within the view of the driver. Specifically, an object detector can be used to detect an object in a blind spot of a vehicle and to adjust the side view mirror such that a driver can see the blind spot. Further, the object detector could be configured to detect a position of the object to better point the side view mirror. This can also include tracking the object. In addition, a detector could be included to detect a position of a driver's viewpoint to better aim the side view mirror.

What is described below is a technique for viewing a blind spot of a vehicle using a mirror, such as a side view mirror. For purposes of illustration and description, an automobile environment will be used. However, the present invention is not limited to automobiles but can also apply to other vehicles and transportation devices, including land, air and water craft. Moreover, the application of the present invention can also apply to other mirrors such as rear view mirrors or auxiliary mirrors and also to camera devices. One of ordinary skill in the art having the benefit of this disclosure will realize that the devices and procedures described herein for making such devices could be used in other applications.

Turning to the drawings, FIG. 1, shows an apparatus to observe an object 12 within a visual blind spot 14 of a motor vehicle 10 using a mirror 16. The apparatus includes at least one motor 18 mechanically coupled to the mirror 16. The at least one motor 18 can be co-located with the mirror 16 in a side view mirror housing 20 as shown, for example. The at least one motor 18 can also be remotely located from the mirror, within the door or body of the vehicle 10 for example, and mechanically connected to the mirror by cables. The position of the mirror can be adjusted by the at least one motor. Typically, two motors can be used to adjust the up/down and left/right positions of the mirror.

The apparatus includes an object detector 22 that can detect objects 12 within a visual blind spot 14 of the vehicle 10. Typically, the object detector 22 can comprise a sonar, radar, thermal, or optical unit, as are known in the art. The object detector 22 is operable to provide a detection signal 24 to the at least one motor 18 to adjust a position of the mirror 16 to provide a view 28 of the blind spot 14 of the vehicle 10 to a driver 26 of the vehicle 10.

In practice, the apparatus includes a processor 30 that can include a memory that can pre-store a setting of the at least one motor 18 that provides a position of the mirror 16 giving a view 28 of the blind spot 14. Optionally, the memory can pre-store a second setting of the at least one motor 18 that provides a normal viewing position 32 of the mirror 16.

In operation, the detection signal 24 from the object detector 22 is used to toggle the mirror 16 between the normal viewing position 32, where the mirror is positioned for a normal view 34 behind the vehicle, and blind spot viewing position (as shown) depending on whether an object 12 is detected in the blind spot 14 of the vehicle 10. Preferably, the memory can pre-store normal and blind spot viewing positions of the mirror 16 for more than one driver.

Preferably, the object detector 22 can not only detect an object but also estimate a position of an object 12 within the blind spot 14 of the vehicle 10 and provide a position signal 36 to provide a control signal 44 for the at least one motor 18 to adjust the position of the mirror 16 to track the object 12. For example, in sonar detection, the time of arrival of a signal 38 reflected from the object 12 can be used determine a distance of the object 12 from the vehicle. This, along with the pointing position of the object detector 22 can be used to estimate a position of the object 12 and whether it is in the blind spot 14 of the vehicle 10.

In a preferred embodiment, the present invention includes a viewing position detector 40 that can detect 42 a viewing position of a driver. For example, systems are known that can detect a position of a driver's head, and even a driver's eyes, and what direction they are facing. Locating a driver's head or eyes can be accomplished using a sonar, thermal, capacitive, or camera/optical unit, as are known in the art. In this regard, when an object 12 is detected in the vehicle blind spot 14 by the object detector 22, the viewing position detector 40 can provide a control signal 46 for the at least one motor 18 to adjust the position of the mirror 16 to maintain the vehicle blind spot 14 within a driver's view 28.

Preferably, the viewing position detector 40 is used in conjunction within the object detector 22. As before, the viewing position detector 40 is used to detect a viewing position of a driver. However, in this case the object detector has the capability to not only detect an object but also to estimate a position of an object within the blind spot of the vehicle. In this embodiment, when an object is detected (and position estimated) in the vehicle blind spot by the object detector, the viewing position detector and object detector can provide individual control signals 36, 46 that can be combined 44 for the at least one motor 18 to adjust the position of the mirror 16 to maintain the object 12 that is in the vehicle blind spot 14 within the driver's view 28. Ideally, the signals 24, 36 are combined within a processor 30 that can already exist within the vehicle or be dedicated for this application.

Figure 2:
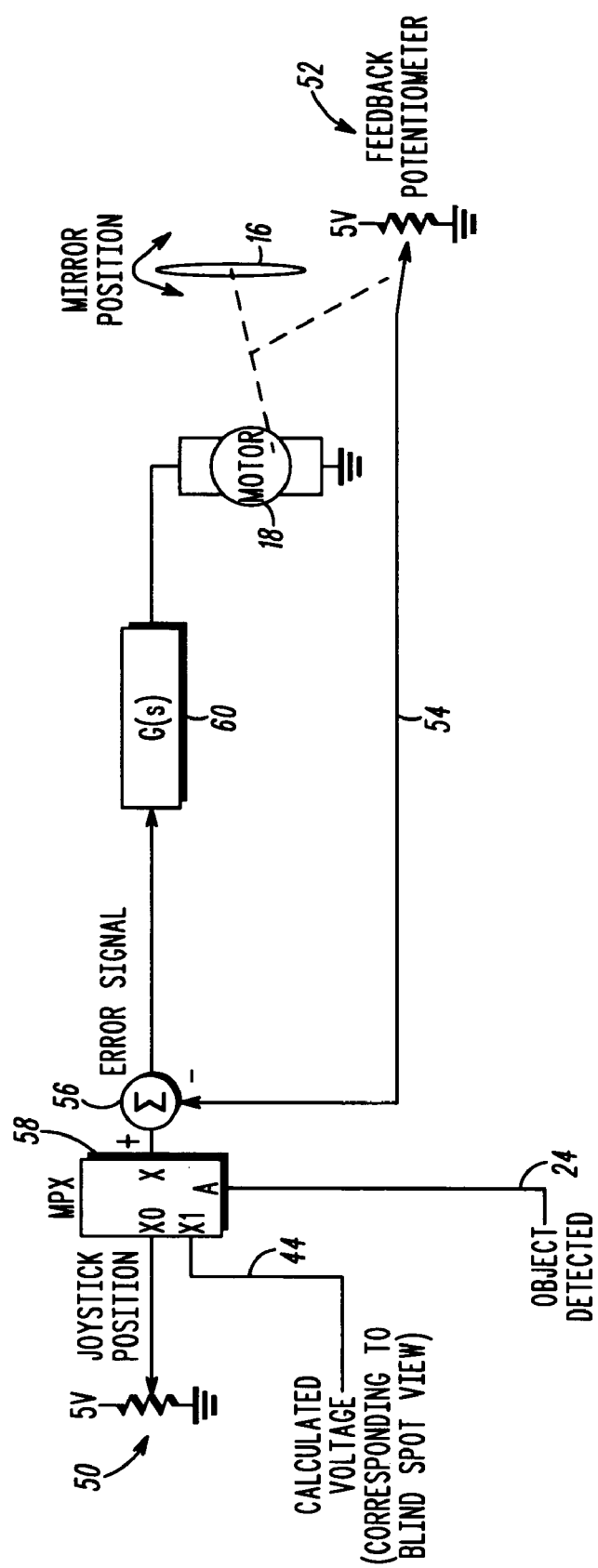
FIG. 2 is a schematic diagram of a vehicle blind spot viewing apparatus, in accordance with the present invention.

FIG. 2 represents particular circuitry that can be used in accordance with the present invention. In more detail a servo control system is used to control the mirror position, with various inputs as will be described below. A power side view mirror is incorporated with a fast moving motor (of perhaps 30 degree rotation per second) as part of a servo control system. The driver controls the mirror's position by indirectly manipulating a potentiometer 50, such as with a joystick or within two-way controls that are commonly known in vehicle. The potentiometer 50 is part of the servo control system and is adjusted as if it is the actual mirror. The fast moving power mirror used as the warning for a side object detector. When the object detector detects an object in the blind spot, the mirror is quickly moved to a blind spot view position that allows it to reflect an image of the blind spot to the driver.

Movement of joystick 50 causes the motor 18 to move, re-positioning mirror 16. A feedback potentiometer 52 is coupled to the mirror and provides feedback 54 to a summer 56 to reduce the error signal toward zero. In practice, the joystick position and feedback potentiometer are correlated. A multiplexer (MPX) switches control value, X, in response to the detection signal, A, from the object detector. Upon receiving the detection signal, A, the multiplexer 58 switches control of the mirror from the driver control, X0, to a calculated signal, X1, that is predetermined, along with the transfer function 60, to move the mirror to provide a view of the blind spot.

Preferably, the object detector and/or the driver viewing position can be tracked and their signals combined 44 to provide a tracking voltage to the motor control to maintain the object within a view of the driver. More preferably, this tracking function is under control of software in a processor to provide the control signal 44.

Figure 3:
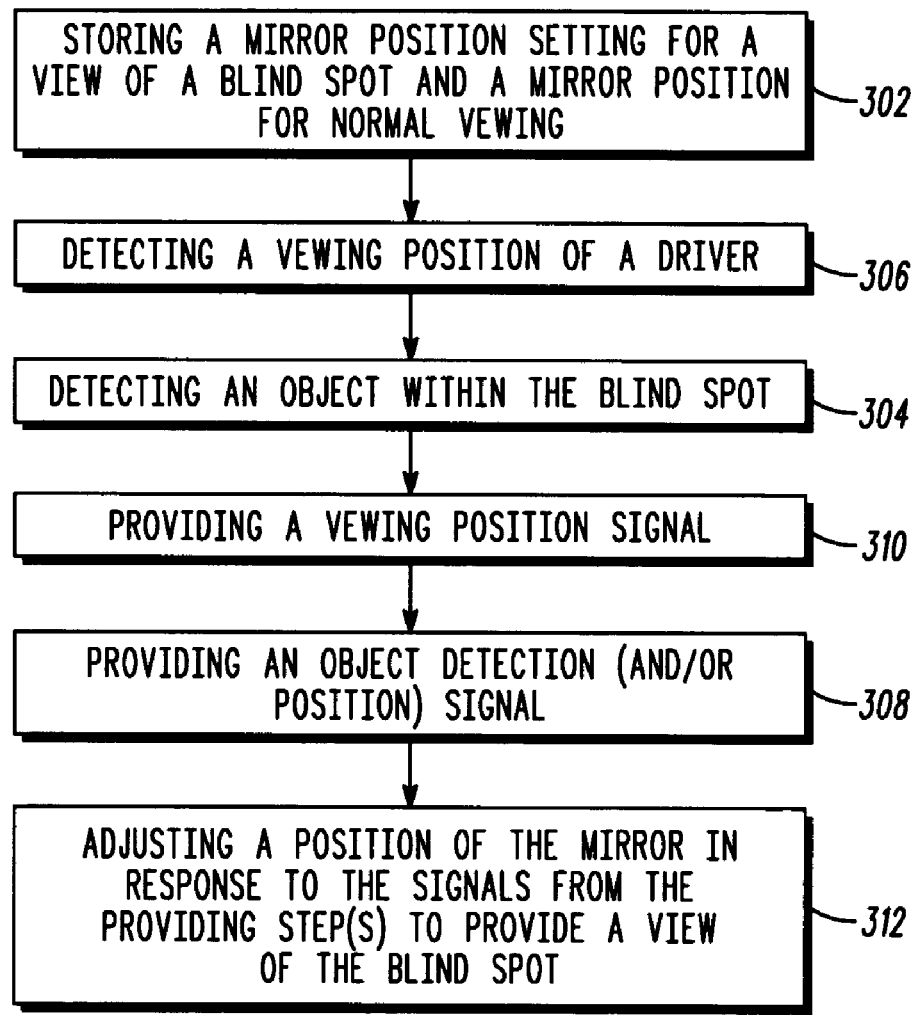
FIG. 3 is a method for viewing a vehicle blind spot, in accordance with the present invention.

As shown in FIG. 3, the present invention also provides a method of viewing an object in a blind spot of a motor vehicle using a mirror. The method includes a first step 304 of detecting an object within a visual blind spot of a vehicle. This can be accomplished using a side object detection system, such as a sonar, radar, thermal, or optical device, as are known in the art.

A next step 308 includes providing a detection signal. The detection signal can be provided directly to the motor. Preferably, the detection signal is provided to a motor controller, such as a processor for example. The processor can be an existing processor used to control other systems in the vehicle, or can be a dedicated processor used for mirror control.

A next step 312 includes adjusting a position of the mirror in response to the detection signal to provide a view of the blind spot of the vehicle to a driver of the vehicle.

Optionally, the method includes a further step 302 of storing a first setting of at least one motor coupled to a side view mirror that provides a first position of the mirror giving a view of the blind spot and a second setting of the at least one motor that provides a second viewing position of the mirror. In this embodiment, the adjusting step 312 includes toggling the side view mirror between the first and second viewing positions depending on the detection signal from the providing step 308.

Preferably, the detecting an object 304 step includes detecting a position of an object within the blind spot of the vehicle, instead of just the presence of the object. Radar and sonar systems are able to provide a distance to an object and could be used to estimate a location of the object given a predetermined geometry of the blind spot of the vehicle, a distance determined by the object detector, and a direction that the object detector is aimed. These parameters can be compared and analyzed to determine a location of an object within a blind spot of the vehicle. In this embodiment, the providing step 308 includes providing a (detection and/or a) position signal, and the adjusting step 312 includes adjust the position of the mirror, using the motors coupled thereto, to track the object in response to the position signal.

Additionally, the method can further includes the steps of detecting 306 a viewing position of a driver and providing 310 a viewing position signal. This can be accomplished using a sonar, thermal, capacitive, or camera/optical unit, as are known in the art. In this embodiment, the adjusting step 312 includes adjusting the position of the mirror to maintain the vehicle blind spot within the driver's view in response to the viewing position signal from the providing step 310.

In a preferred embodiment, the method includes the further steps of detecting 306 a viewing position of a driver and providing 310 a viewing position signal, wherein the detecting 304 an object step includes detecting a position of an object within the blind spot of the vehicle, and the providing step 308 includes providing an object position signal. In this embodiment, the adjusting step 312 includes adjust the position of the mirror to track the object in the visual blind spot in response to the position signal and the viewing position signal from the respective providing steps 308, 310.

What has been described is a novel technique for a driver to be made aware of objects in a blind spot of a vehicle. In basic form, the present invention can work with existing hardware with only a software modification. In a more advanced form, known hardware components can be added to a vehicle with such components driven by a software program. In either case, no new hardware must be derived for this application. This provides a cost effective solution for a driver to observe objects within a blind spot of a vehicle.

The above description of the present invention is intended to be exemplary only and is not intended to limit the scope of any patent issuing from this application. The present invention is intended to be limited only by the broad scope of the following claims.

What is claimed is:

1. An apparatus to observe an object within a visual blind spot of a motor vehicle using a minor, the apparatus comprising:
    at least one motor mechanically coupled to a mirror for positioning the mirror; and
    an object detector for detecting objects within a visual blind spot of a vehicle, wherein, when an object is detected, the object detector provides a detection signal to the at least one motor to adjust a position of the mirror to provide a view of the blind spot of the vehicle to a driver of the vehicle, and
    wherein the at least one motor adjusts the position of the mirror to provide the view of the blind spot of the vehicle based at least on a viewing position signal corresponding to a viewing position of the driver, the viewing position signal provided to the at least one motor when the object is detected in the vehicle blind spot by the object detector.

2. The apparatus of claim 1, further comprising a memory that can pre-store a setting of the at least one motor that provides a position of the mirror giving the view of the blind spot.

3. The apparatus of claim 2, wherein the memory can pre-store a second setting of the at least one motor that provides a normal viewing position of the mirror, wherein the detection signal from the object detector is used to toggle the mirror between the normal and blind spot viewing positions depending on whether an object is detected in the blind spot of the vehicle.

4. The apparatus of claim 2, wherein the memory can pre-store normal and blind spot viewing position of the mirror for more than one driver.

5. The apparatus of claim 1, wherein the object detector can detect a position of the object within the blind spot of the vehicle and provide a position signal for the at least one motor to adjust the position of the mirror to track the object.

6. The apparatus of claim 1, further comprising a viewing position detector that can detect the viewing position of the driver, wherein, when the object is detected in the vehicle blind spot by the object detector, the viewing position detector can provide a control signal to the at least one motor to adjust the position of the mirror to maintain the vehicle blind spot within the driver's view.

7. The apparatus of claim 6, wherein the viewing position detector detects a position of at least one of the group consisting of a driver's head and a driver's eyes.

8. The apparatus of claim 1, further comprising a viewing position detector that can detect the viewing position of the driver, wherein the object detector can detect a position of the object within the blind spot of the vehicle, and wherein, when the object is detected in the vehicle blind spot by the object detector, the viewing position detector and the object detector can provide individual control signals to the at least one motor to adjust the position of the mirror to maintain the object that is in the vehicle blind spot within the driver's view.

9. A motor vehicle having an apparatus to observe objects in a visual blind spot of a vehicle, the motor vehicle comprising:
    a side view mirror;
    at least one motor mechanically coupled to the side view mirror for positioning the side view mirror;
    a controller for controlling the at least one motor; and
    an object detector for detecting objects within a visual blind spot of a vehicle, wherein, when an object is detected, the object detector provides a detection signal to the controller,
    wherein the controller, based at least on a first control signal corresponding to a viewing position of a driver, the first control signal provided to the controller when the object is detected in the vehicle blind spot by the object detector, provides a second control signal to the at least one motor to adjust a position of the side view mirror to provide a view of the blind spot of the vehicle to the driver of the vehicle, and
    wherein the at least one motor responsively adjusts the position of the side view mirror to provide the view of the visual blind spot of the vehicle.

10. The vehicle of claim 9, further comprising a memory that can pre-store a first setting of the at least one motor that provides a position of the side view mirror giving the view of the blind spot and a second setting of the at least one motor that provides a normal viewing position of the side view mirror, wherein the detection signal from the object detector is used by the controller to send a control signal to the at least one motor to toggle the side view mirror between the normal and blind spot viewing positions depending on whether an object is detected in the blind spot of the vehicle.

11. The vehicle of claim 10, wherein the memory can pre-store normal and blind spot viewing position of the side view mirror for more than one driver.

12. The vehicle of claim 9, wherein the object detector can detect a position of the object within the blind spot of the vehicle and provide a position signal to the at least one motor to adjust the position of the side view mirror to track the object.

13. The vehicle of claim 9, further comprising a viewing position detector that can detect the viewing position of the driver, wherein, when the object is detected in the vehicle blind spot by the object detector, the viewing position detector can provide the first control signal to the controller for use in controlling the at least one motor to adjust the position of the side view mirror to maintain the vehicle blind spot within the driver's view.

14. The vehicle of claim 13, wherein the viewing position detector detects a position of at least one of the group consisting of a driver's head and a driver's eyes.

15. The vehicle of claim 9, further comprising a viewing position detector that can detect the viewing position of the driver, wherein the object detector can detect a position of the object within the blind spot of the vehicle, and wherein, when the object is detected in the vehicle blind spot by the object detector, the viewing position detector and the object detector can provide individual control signals to the controller for controlling the at least one motor to adjust the position of the side view mirror to maintain the object that is in the vehicle blind spot within the driver's view.

* * * * *